3,632,757
PESTICIDAL COMPOSITIONS AND METHODS CONTAINING 2 - (O,O-DIALKYL-PHOSPHORYL)- 6 - CARBALKOXY OR CARBALKENOXY-PYR- AZOLO-PYRIMIDINES
Otto Scherer, Bad Soden, Taunus, and Hilmar Mildenberger, Kalkheim, Taunus, Germany, assignors to Farbwerke Hoechst Aktiengesellschaft vormals Meister Lucius & Bruning, Frankfurt am Main, Germany
No Drawing. Application Aug. 17, 1966, Ser. No. 572,878, which is a continuation-in-part of application Ser. No. 527,519, Feb. 15, 1966. Divided and this application Oct. 13, 1969, Ser. No. 871,004
Claims priority, application Germany, Feb. 20, 1965, F 45,303, F 45,304
Int. Cl. A01n 9/36; A61l 13/00
U.S. Cl. 424—200
10 Claims

ABSTRACT OF THE DISCLOSURE

A composition containing, as the active ingredient, a compound of the formula

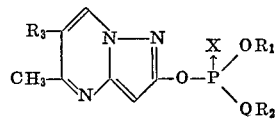

in which $R_1$ and $R_2$ are alkyl of 1 to 4 carbon atoms, $R_3$ represents a carbalkoxy of up to 13 carbon atoms or carballyloxy, and X stands for oxygen or sulfur, is effective against plant-sucking and plant-eating insects, Acarida such as spider mites and ticks in all stages of development including their eggs, as well as against nematodes and phytopathogenous fungi.

---

The present invention relates to novel phosphoric acid ester derivatives, their use as pesticides, a process for preparing them, and to pesticidal compositions.

This application is a division of copending application Ser. No. 572,878 filed Aug. 17, 1966, which in turn is a continuation-in-part application of co-pending application Ser. No. 527,519 filed on Feb. 15, 1966 by Otto Scherer et al. for "Process for the manufacture of novel phosphoric acid ester derivatives and their use as pesticides," said latter application now being abandoned.

The active ingredients of the compositions of the present invention have the following formula

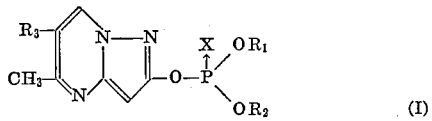

in which $R_1$ and $R_2$ each represent a low molecular weight alkyl radical having 1 to 4 carbon atom, $R_3$ stands for carbalkoxy of up to 13 carbon atoms or carballyloxy, and X stands for oxygen or sulfur. They can be prepared by reacting phosphoric acid halides of the following formula

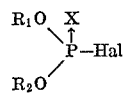

in which X, $R_1$ and $R_2$ have the meanings given above and Hal stands for a halogen atom, with a corresponding 2-hydroxy-pyrazolo-pyrimidine in the presence of an acid-binding substance, for example, an alkali metal carbonate or a tertiary base such as triethylamine or pyridine, or with a 2-hydroxy-pyrazolo-pyrimidine salt, for example an alkali metal salt thereof.

Among the compounds of Formula I that have shown unexpectedly good efficacy as pesticides, special mention should be made of those in which $R_3$ is a carbalkoxy or carbalkenoxy group. Compounds in which $R_3$ is carbomethoxy, carbethoxy, carbododecyloxy or carboallyloxy are preferred.

The active ingredients can be prepared as indicated in the following reaction equations (a)

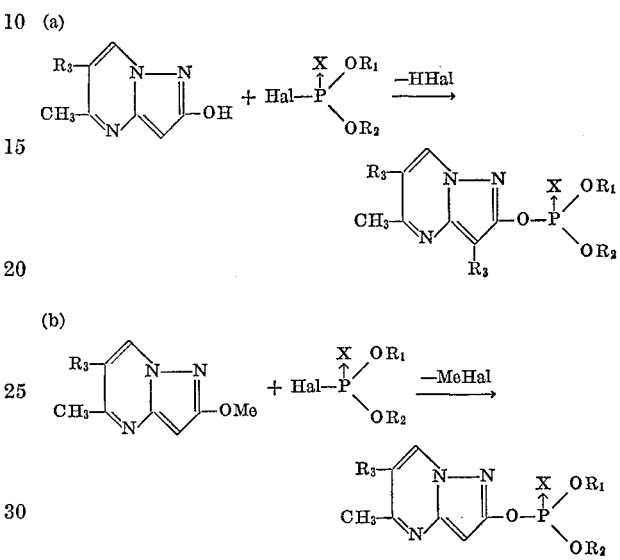

(b)

The reaction may be carried out in the presence or absence of a solvent. As solvents it is advantageous to use aliphatic ketones of low molecular weight, for example, acetone or methyl ethyl ketone, nitriles such as acetonitrile, esters such as acetic methyl ester, ethers such as tetrahydrofurane or dioxane, chlorinated hydrocarbons such as $CH_2Cl_2$ or carbon tetrachloride, or aromatic substances such as benzene, xylene or simple derivatives thereof such as chlorobenzene, dichlorobenzene or nitrobenzene.

The reaction generally proceeds with sufficient speed already at a temperature of about 15° to 25° C. It may be increased by raising the temperature, for example, to 50° to 70° C. or to reflux temperature and/or by adding a small amount of copper powder.

The compounds obtained by the process of the invention are oils which cannot be distilled without decomposition, or solid crystalline products.

The compounds of the invention are effective against plant-sucking and plant-eating insects, and Acarida, such as spider mites and ticks, in all stages of development, inclusively their eggs. They are also effective against nematodes and phytopathogenous fungi.

The novel active substances are used in the usual mixtures with solid or liquid inert carrier materials, adhesives, wetting or dispersing agents or grinding auxiliary agents as dusting or spraying preparations in the form of aqueous spraying liquids or emulsions, either alone or in admixture with other active substances. They are effective as feeding and contact poison or in the form of vapor and have also a systemic action.

It should be noted that the compounds of the invention have, in part, an improved action against pests and, in part, a lower toxicity to warm-blooded animals as compared with known commercial preparations, and that they simultaneously have a fungicidal action.

The following examples serve to illustrate the invention but they are not intended to limit it thereto.

EXAMPLE 1

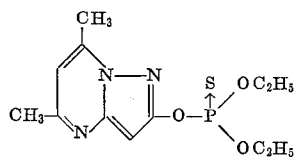

*Analysis.*—M (315). Calculated (percent): P, 9.8; N, 13.3. Found (percent): P, 9.7; N, 13.1.

48.9 g (0.3 mole) 2-hydroxy-5.7-dimothyl-pyrazolo-pyrimidine were added to a solution of 0.3 mole sodium ethylate in 200 cc. ethanol. To the clear solution so obtained, 56.4 g. (0.3 mole) O,O-diethyl-thiophosphoryl chloride were added dropwise. After stirring for 2 hours at 50° to 50° C., the reaction mixture was separated from the precipitated sodium chloride by suction filtration. After the ethanol had been distilled off, the 2-(O,O-diethyl - thiono - phosphoryl) - 5,7 - dimethyl - pyrazolo-pyrimidine crystallized out from the filtrate.

After recrystallization from a mixture of benzene and petroleum ether, colorless scales melting at 45° C. were obtained. The yield amounted to 75 g.

EXAMPLE 2

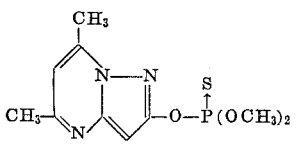

*Analysis.*—M (287). Calculated (percent): P, 10.8; N, 14.6. Found (percent): P, 10.7; N, 14.6.

160.4 g. (1 mole) O,O-dimethyl-thiophosphoryl-chloride were added dropwise to a suspension of 185 g. (1 mole) of the sodium salt of 2-hydroxy-5.7-dimethyl-pyrazolo-pyrimidine in 800 cc. methyl ethyl ketone. The mixture so obtained was stirred for 1 hour at a room temperature of 20° C. and then filtered. When the solvent was filtered off, 2-(O,O-dimethyl-thiono-phosphoryl)-5.7-dimethyl-pyrazolo-pyrimidine crystallized out from the filtrate.

A slightly yellow powder melting at 72° C. to 74° C. was obtained. The yield amounted to 282 g.

EXAMPLE 3

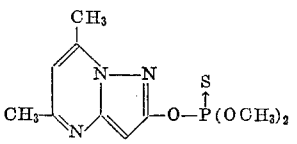

48.9 g. (0.3 mole) 2-hydroxy-5.7-dimethyl-pyrazolo-pyrimidine and 40 g. K₂CO₃ were suspended in 100 cc. acetone. 48 g. (0.3 mole) O,O-dimethyl-thiophosphoryl chloride were added drop-wise while stirring and the reaction mixture was heated for 2 hours at 40° to 50° C. After filtering off from the excess amount of K₂CO₃ and KCl, 84 g. 2-(O,O-dimethyl-thiene-phosphoryl)-5,7-dimethyl-pyrazolo-pyrimidine melting at 72° to 74° C. were obtained from the acetonic solution.

EXAMPLE 4

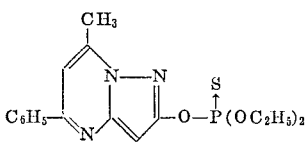

*Analysis.*—M (365). Calculated (percent): P, 8.4; N, 11.5. Found (percent): P, 8.1; N, 11.1.

45 g. (0.2 mole) 2-hydroxy-5-phenyl-7-methyl-pyrazolo-pyrimidine were suspended in 200 cc. xylene. After the addition of 0.2 mole triethylamine, 38 g. (0.2 mole) O,O-diethyl-thiophospheryl-chloride were added dropwise. The mixture so obtained was heated for 3 hours at 80° C. and filtered off with suction from the triethylamino hydrochloride formed.

From the filtrate, the 2-O,O-diethyl-thionophosphoryl)-5-phenyl-7-methyl-pyrazolo-pyrimidine was isolated. 68 g. of a viscous oil were obtained.

EXAMPLE 5

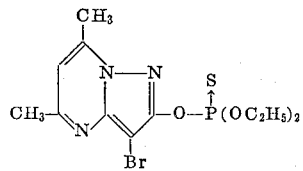

*Analysis.*—M (394). Calculated (percent): P, 7.8; N, 10.7. Found (percent): P, 7.4; N, 11.0.

26 g. (0.93 mole) of the potassium salt of 2-hydroxy-3 - bromo - 5.7 - dimethyl - pyrazolo - pyrimidine were suspended in 250 cc. tetrahydrofurane. 17.7 g. (0.93 mole) O,O-diethyl-thiophosphoryl chloride were then added dropwise. The reaction mixture was heated for 4 hours under reflux, and filtered off with suction from the KCl which had separated. The tetrahydrofurane was then distilled off from the filtrate.

As residue 2 - (O,O - diethyl- thiono - phosphoryl) - 3-bromo-5.7-dimethyl-pyrazolo-pyrimidine was obtained. The yield amounted to 36.5 g. The product constituted a viscous yellow oil which solidified after some time.

EXAMPLE 6

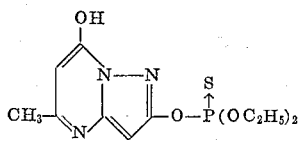

*Analysis.*—M (317). Calculated (percent): P, 9.7; S, 10.1. Found (percent): P, 10.1; S, 10.3.

22 g. (0.12 mole) of the sodium salt of 2.7-dihydroxy-5-methyl-pyrazolo-pyrimidine were suspended in 200 cc. acetic acid methyl ester. About 0.5 g. copper power was added and 23 g. (0.12 mole) O,O-diethyl-thiophosphoryl chloride were dropped in. The mixture so obtained was heated for 4 hours under reflux and filtered, and the solvent was then removed from the filtrate.

As residue, 28 g. 2-(O,O-diethyl-thiono-phosphoryl)-5-methyl-7-hydroxy-pyrazolo-pyrimidine were obtained in the form of a viscous red oil.

EXAMPLE 7

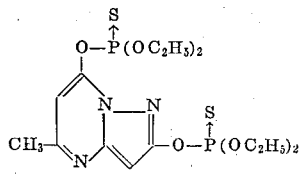

*Analysis.*—M (469). Calculated (percent): S, 13.6; P, 13.2. Found (percent): S, 13.4; P, 13.8.

26 g. (0.125 mole) of the disodium salt of 2.7-dihydroxy-5-methyl-pyrazolo-pyrimidine were stirred for 3 hours at 70° C. with 48 g. (0.25 mole) O,O-diethyl-thiophosphoryl chloride in 200 cc. acetonitrile. The solution was freed from the NaCl formed, concentrated, taken up in benzene and washed with a 2 N-solution of NaHCO₃ and with water.

By drying the solution and distilling off the benzene, 35 g. 2.7 - bis-(O,O-diethyl-thiono-phosphoryl)-5-methyl-pyrazolo-pyrimidine were obtained in the form of a red-brown oil.

EXAMPLE 8

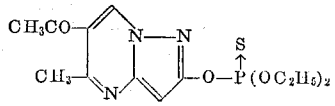

*Analysis.*—M (343). Calculated (percent): P, 9.05; N, 12.2. Found (percent): P, 8.9; N, 12.2.

A mixture of 0.225 mole (48 g.) of the sodium salt of 2 - hydroxy-5-methyl-6-acetyl-pyrazolo-pyrimidine, about 0.5 g. copper powder, 42.5 g. (0.225 mole) O,O-diethyl-thiophosphoryl chloride and 200 cc. acetone was stirred for 2 hours at 40° to 50° C. The filtrate was freed from the NaCl which had been formed, and concentrated, the residue was dissolved in methylene chloride and washed with a 2 N-soda solution and water.

After distilling off the methylene chloride, 68 g. 2-(O,O-diethyl-thiono-phosphoryl)-5-methyl - 6 - acetyl-pyrazolo-pyrimidine were obtained from the organic phase in the form of a non-distillable oil.

EXAMPLE 9

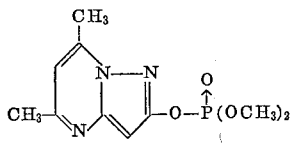

*Analysis.*—M (271). Calculated (percent): P, 11.4; N, 15.5. Found (percent): P, 11.0; N, 15.5.

44 g. (0.3 mole) O,O-dimethyl-phosphoryl chloride were added dropwise to 56 g. (0.3 mole) of the sodium salt of 2-hydroxy-5,7-dimethyl-pyrazolo-pyrimidine in 200 cc. methylene chloride. During this procedure the temperature rose from 20° C. to 38° C. The mixture was then stirred for 2 hours at a room temperature of 20° C. The filtrate was freed from NaCl and washed as described in Example 8.

By removing the solvent, 80 g. 2-(O,O-dimethyl-phosphoryl)-5.7-dimethyl-pyrazolo-pyrimidine were obtained in the form of a colorless powder melting at 79° C. to 81° C.

EXAMPLE 10

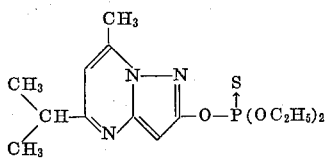

*Analysis.*—M (343). Calculated (percent): P, 9.0; N, 12.2. Found (percent): P, 8.5; N, 11.8.

3.8 g. (0.094 mole) NaOH were dissolved in 200 cc. methanol. To the solution so obtained, 18 g. (0.094 mole) 2 - hydroxy - 5-isopropyl - 7 - methy pyrazolo-pyrimidine were added. From the resulting clear solution the methanol was distilled off, the residue was taken up in acetone, and a small amount of copper powder and 18 g. (0.095 mole) O,O-diethyl-thiophosphoryl chloride were added. The mixture so obtained was stirred at 50° C. for 2 hours and worked up as described in Example 8.

25 g. 2-(O,O-diethyl - thiono-phosphorpyl)-5-isopropyl-7-methyl-pyrazolo-pyrimidine were obtained in the form of a yellow oil which soldified on cooling down to −20° C.

EXAMPLE 11

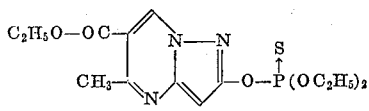

*Analysis.*—M (373). Calculated (percent): P, 8.3; S, 8.6. Found (percent): P, 8.0; S, 6.5.

A mixture of 24.3 g. (0.1 mole) of the sodium salt of 2-hydroxy - 5 - methyl-7-carbethoxy-pyrazolo-pyrimidine, 18.9 g. (0.1 mole) O,O-diethyl-thiophosphoryl chloride and 200 cc. acetone was stirred at about 50° C. for 8 to 10 hours. From the filtrate which had been freed from NaCl, 37 g. 2-(O,O-diethyl-thionophosphoryl) - 5 - methyl-6-carbethoxy-pyrazolo-pyrimidine were obtained in the form of a yellow oil (melting point 38° C. to 40° C.).

EXAMPLE 12

22.1 g. (0.1 mole) 2-hydroxy-5-methyl-6-carbethoxy-pyrazolo-pyrimidine were suspended in 200 cc. benzene. 18.9 g. (0.1 mole) O,O-diethyl-thiophosphoryl chloride and 12 g. (0.12 mole) triethylamine were then added dropwise one after the other. After heating for 5 hours at about 50° C. to 55° C. the mixture was cooled and the triethylamino hydrochloride which had been formed was removed by shaking out with water. The dried benzene solution was evaporated.

As residue 36 g. 2-(O,O-diethyl - thiono-phosphoryl)-5-methyl-6-carbethoxy-pyrazolo-pyrimidine were obtained in the form of a red-brown oil which solidified slowly (melting point 38° C. to 40° C.).

EXAMPLE 13

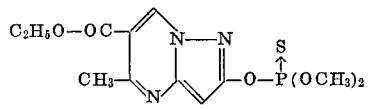

*Analysis.*—M (345). Calculated (percent): P, 9.0; S, 9.3. Found (percent): P, 8.6; S, 9.7.

The process was carried out in a manner analogous to that described in Example 11 (0.1 molar), but while using, instead of diethyl-thiophosphoryl chloride, O,O-dimethyl-thiophosphoryl chloride (0.1 mole=16.1 g.). There were obtained 2-(O,O-dimethyl-thiono-phosphoryl)-5-methyl - 6 - carbethoxy-pyrazolo-pyrimidine in the form of a yellow wax-like compound melting at about 25° C. The yield was quantitative.

EXAMPLE 14

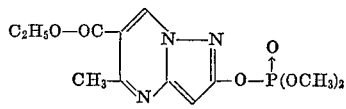

*Analysis.*—M (329). Calculated (percent): P, 9.4; N, 12.8. Found (percent): P, 9.9; N, 12.4.

By proceeding in a manner analogous to that described in Example 11, but using, instead of diethyl-thiophosphoryl chloride, 0.1 mole=14.7 g. dimethyl-phosphoryl chloride, there were obtained 32 g. 2-(O,O-dimethyl-phosphoryl)-5-methyl - 6 - carbethoxy-pyrazolo-pyrimidine in the form of a red-brown oil.

EXAMPLE 15

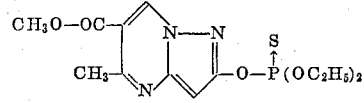

*Analysis.*—M (359). Calculated (percent): P, 8.6; N, 11.7. Found (percent): P, 8.3; N, 11.0.

A mixture of 41.4 g. (0.2 mole) 2-hydroxy-5-methyl-6-carbomethoxy-pyrazolo-pyrimidine, 37.8 g. (0.2 mole) diethyl-thiophosphoryl chloride, 22 g. (0.22 mole) triethylamine and 300 cc. acetone was heated for 5 hours at 60° C. The triethylamino hydrochloride was then suction-filtered and the solvent was distilled off.

67 g. 2-(O,O-diethyl-thiono-phosphoryl) - 5 - methyl-6-carbomethoxy-pyrazolo-pyrimidine were obtained in the form of a brown oil which solidified slowly.

EXAMPLE 16

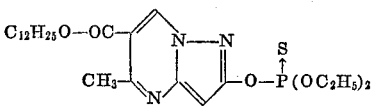

*Analysis.*—M (513). Calculated (percent): P, 6.1. Found (percent): P, 6.4.

23 g. (0.064 mole) 2-hydroxy - 5 - methyl-6-carbododecyloxy-pyrazolo-pyrimidine were dissolved in 200 cc. acetone 12.5 g. (0.006 mole) diethyl-thiophosphoryl chloride and 8 g. (0.08 mole) triethylamine were then added dropwise one after the other. After stirring for 6 hours at 50° C., the triethylamino hydrochloride was removed and the filtrate was freed from solvent and the excess amount of starting compound. As residue 32 g. 2 - (O,O-diethyl-thiono-phosphoryl) - 5 - methyl - 6 - carbododecyloxy-pyrazolo-pyrimidine melting at 50° C. to 54° C. were obtained.

EXAMPLE 17

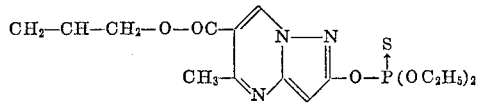

Analysis.—M (361). Calculated (percent): P, 8.6; N, 11.6. Found (percent): P, 8.3; N, 11.1.

A mixture of 23.3 g. (0.1 mole) 2-hydroxy-5-methyl--6-carballyloxy-pyrazolo-pyrimidine, 18.9 g. (0.1 mole) diethyl-thiophosphoryl chloride and 12 g. (0.12 mole) triethylamine in 200 cc. methyl ethyl ketone was heated for 8 hours at 50° C. The filtrate was freed from triethylamino hydrochloride and evaporated. 35 g. 2 - (O,O-diethyl - thiono - phosphoryl) - 5 - methyl - 6 - carboallyloxy-pyrazolo-pyrimidine were obtained in the form of an oil which solidified slowly to yield a wax.

EXAMPLE 18

A wettable powder was obtained by mixing the following components:

10% of O,O-dimethyl-O-(5.7-dimethyl-pyrazolo-pyrimidyl-(2))-thiophosphoric acid ester
10% of active silicic acid
10% of aluminum silicate
3.5% of alkyl-arylsulfonate as wetting agent
56.5% of sodium sulfate
10% of cellulose pitch.

By suspending in water, a spraying liquid was obtained, which was applied in a concentration of 0.05%, i.e. with an active substance concentration of 0.005%. In laboratory tests, small unripe apples were sprayed and eggs of codling moths (Carpocapsa pomonella) were placed near the apples so that the caterpillars could reach the apples of their own strength and seek a place for boring into the apples as is the case in nature. The treated apples were not infested and 100% of the caterpillars died, at the latest on boring, even when up to 15 eggs had been laid per apple and all the caterpillars had hatched.

For a comparison, O,O-diethyl-O-(2 - isopropyl - 4-methyl-pyrimidyl - 6) - thionophosphate (cf. Schrader "Die Entwicklung neuer insektizider Phosphorsäureester." 1963, Verlag Chemie, page 149) was used. With the same active substance concentration of 0.005%, only 68% of the caterpillars was destroyed and with twice the concentration (0.01%) only 83%.

EXAMPLE 19

An aqueous spraying liquid obtained from a wettable powder containing 10% of O,O-diethyl-O-(5 - phenyl-7-methyl-pyrazolo-pyrimidyl - (2)) - thiophosphoric acid ester in a formulation analogous to that of Example 18, was sprayed on cotton and lucerne infested with Prodenia litura. By applying the wettable powder in a concentration of 0.25%, i.e. by using 0.025% of active substance, further damage by the caterpillars was prevented and the latter were destroyed the same day. Even in the case of large caterpillars of the fifth stage, destruction amounted to 100%.

EXAMPLE 20

A wettable powder containing 10% of O,O-dimethyl-O-(5.7 - dimethyl - pyrazolo - pyrimidyl - (2)) - thiophosphoric acid ester in a formulation analogous to that of Example 18 was used in aqueous suspension against wheat mildew. With a concentration of 0.06% of active substance a destruction of 96% was obtained, and with a concentration of 0.03% of active substance a destruction of 90%.

In the case of bean mildew, a destruction of 97% was obtained with an active substance concentration of 0.025% and a destruction of 92% with an active substance concentration of 0.012%.

EXAMPLE 21

Larvae of the fourth stage of African migratory locust (Pachytilus migratorius migratoriodies) were destroyed within a few hours by spraying them directly with a 0.1% aqueous emulsion of an emulsifiable spraying preparation of the following composition:

10% of O,O-diethyl-O-(5.7-dimethyl-pyrazolo-pyrimidyl-(2))-thiophosphoric acid ester
78% of ethanol
10% of an oxethylated alkylphenol
2% of epichlorhydrine.

The corresponding dimethyl compound was completely effective against these larvae with an active substance concentration of 0.02%.

With the comparison substance O,O-dimethyl - 5 - [4-oxo - 1,2,3 - benzotriazine - 3(4H)-yl-methyl]-phosphorus dithioate (Schrader, l.c., page 176) a destruction of only 80% was obtained with 0.02% of active substance. This difference which may perhaps seem only insignificant is, however, important when regarding the difference in toxicity to warm-blooded animals. The acute oral LD 50 (lethal dose to 50%) for female albino rats was 62 mg./kg. of the compound of the invention, while it was 10 to 18 mg./kg. for "Azinphos."

EXAMPLE 22

Plant-sucking pests, i.e. plant-lice, shield-lice and bugs, were destroyed with preparations of O,O-dimethyl-O-(5.7 - dimethyl-pyrazolo-pyrimidyl - (2))-thiophosphoric acid ester formulated as described in Examples 18 and 21.

Dorlis fabae and Pyrethromyzus sanborni on Vicia faba and Chrysanthemum species were all dead a few hours after a single spraying with only 0.00075% of active substance.

EXAMPLE 23

The systemic action of O,O-dimethyl-O-(5.7-dimethyl-pyrazolo-pyrimidyl-(2))-thiophosphoric acid ester could be seen when the substance, in a cotton bandage covered with a plastic sheet, was applied to the stalk of Vicia faba in the formulation of Example 21.

All the plant-lice (Doralis fabae) at the upper parts of the plant were destroyed within a short time by an amount of active substance of only 1 to 2 mg. in the bandage.

EXAMPLE 24

O,O - dimethyl - O - (5.7-dimethyl-pyrazolo-pyrimidyl-(2))-thiophosphoric acid ester had a strong action on insects of the order of Diptera. The action on Musca domestica having a polyvalent resistance was similar to that on normally sensitive Musca domestica. In a Petri dish test in which each dish contained 1 cc. of a 0.01% solution of O,O-dimethyl-O - (5.7 - dimethyl-pyrazolo-pyrimidyl-(2))-thiophosphoric acid ester in acetone and was swung until the solution had dried in order to obtain a uniform distribution, flies placed in the dishes were all in an irreversible dorsal position after 45 to 60 minutes. There was only little difference in promptness of action on normal and resistant flies of both sexes. Even after the open dishes had been aired for 4 weeks, a 100% lethal action on both varieties of flies was observed after a time of action of 3 hours.

EXAMPLE 25

O,O-diethyl - O - (5.7 - dimethyl-pyrazolo-pyrimidyl-(2))-thiophosphoric acid ester admixed with whey cheese as a nutrient medium for larvae of Musca domestica was lethal to the said pests in a concentration of only 0.0001%. Even still lower concentrations used in an appropriate manner yielded high quotas of kill.

EXAMPLE 26

A powder preparation for stored grain consisting of:

2% of 5 - methyl - 2.7 - bis - (O,O-diethyl-thiono-phosphoryl)-pyrazolo-pyrimidine
6% of aluminum hydrosilicate and 92% of talcum was uniformly admixed in known manner in a ratio of 1:1000 with wheat. It destroyed grain weevils (*Calandra granaria*), rice weevils (*Calandra oryzae*) and other storage pests.

EXAMPLE 27

Cockroaches (*Phyllodromia germanica* and *Periplaneta americana*) died when they were placed on a floor which had been dusted with a preparation consisting of 2% of 2 - (O,O-diethylthiono-phosphoryl) - 5 - methyl - 7-hydroxy-pyrazolo-pyrimidine, 6% of aluminum hydrosilicate and 92% of talcum in an amount of 1 to 2 g./m.$^2$.

EXAMPLE 28

Blood-sucking *Ornithodorus moubata* was destroyed with O,O-diethyl-O-(3 - bromo - 5.7 - dimethyl - pyrazolo-pyrimidyl - (2)) - thiophosphoric acid ester in the form of an emulsion (2% of a formulation with 10% of active substance, 78% of ethanol, 10% of a highly concentrated oxethylated alkyl phenol and 2% of epichlorohydrine).

EXAMPLE 29

Eggs of flour moths (*Anagasta kuehniella*) died when they came in contact with a 1% emulsion in water of a formulation containing 10% of O,O-diethyl - O - (5.7-dimethyl-pyrazolo-pyrimidyl - (2)) - thiophosphoric acid ester, 78% of ethanol, 10% of a highly concentrated oxethylated alkyl phenol and 2% of epichlorhydrine.

EXAMPLE 30

Soil strongly infested with nematodes of the genera Pratylenchus, Paratylenchus and Rotylenchus, was freed therefrom by applying the following formulation:

10% of O,O-dimethyl - O - (5.7-dimethyl-pyrazolo-pyrimidyl-(2))-thiophosphoric acid ester
10% of active silicic acid
10% of aluminum silicate
10% of cellulose pitch
56.5% of sodium sulfate
3.5% of alkyl-aryl sulfonate as wetting agent.

50 cc. water containing 1 g. of the above formulation were poured on 200 cc. of the soil in an open container; 0.1 g. of active substance was sufficient for destroying the nematodes.

EXAMPLE 31

Cucumbers of a variety which was susceptible to mildew were strongly infested artifically with a conidium suspension of cucumber mildew (*Erysiphe cichoracearum*). Five days after infestation, the cucumbers were treated with an aqueous emulsion of a preparation of the following composition:

10% of 2-[O,O-diethyl-thiono-phosphoryl]-4-methyl-6-carbethoxy-pyrazolo-pyrimidine
80% of ethyl alcohol
10% of emulsifier (nonylphenol with 10% of ethylene oxide).

The active substance was used in concentrations of 500, 250, 120, 60, 30, 15 and 7.5 mg. respectively, per liter of spray liquor. All plants weer sprayed until they dripped with moisture.

For a comparison, a commercial phosphine oxide preparation effective against mildew and containing bis-(dimethylamino)-(3 - amino-5-phenyl-triazolyl) - phosphine oxide as the active substance was used in the same concentrations of active substance under the same conditions of application. Furthermore, untreated cucumbers were used for a control.

The test result obtained 3 weeks after the treatment is indicated in the following table. It clearly shows the excellent effect of the active substance of the invention against mildew. While the phophoric acid ester in accordance with the invention, in concentrations down to 30 mg. of active substance per liter of spray liquor, completely prevented infestation with mildew, the comparison substance used in the same concentrations could not prevent total infestation. Even when the comparison substance was used in the highest concentration of 500 mg. per liter of spray liquor, infestation with mildew was 20%.

TABLE

| Preparation | Percent of infestation with mildew with mg. of active substance per liter of spray liquor | | | | | | |
|---|---|---|---|---|---|---|---|
| | 500 | 250 | 120 | 60 | 30 | 15 | 7.5 |
| A$^1$ | 0 | 0 | 0 | 0 | 3.1 | 5.0 | 16.0 |
| Commercial preparation used for a comparison | 10 | 20 | 38 | 60 | 70 | 100 | 100 |
| Untreated | 100 | 100 | 100 | 100 | 100 | 100 | 100 |

$^1$A=2-[O, O-diethyl-thiono-phosphoryl]-5-methyl-6-carbethoxypyrazolo-pyrimidine.

EXAMPLE 32

In a cubic box of a volume of 1 m.$^3$ in which common flies (*Musca domestica*) had been placed, 2 cc. of a 0.05% solution of 2-(O,O-diethyl-thiono-phosphonyl)-5-methyl-7-hydroxy-pyrazolo-(1.5a)-pyramidine in petroleum were sprayed at room temperature. All the flies turned irreversibly over on their backs and soon died.

For a comparison, the commercial preparation "Trichlorphon" was used. It had only an insignificant effect even when sprayed in the form of a 0.1% solution.

EXAMPLE 33 (Comparison test)

(a) Wheat artificially infested with mildew (*Erysiphe graminea*) was treated 4 days after infestation with an aqueous emulsion of a preparation of the following composition:

10% of 2-(O,O-diethyl - thiono - phosphoryl)-5-methyl-6-carbomethoxy - pyrazolo - (1.5a)pyrimidine (referred to as "A" in the following table)
80% of ethyl alcohol
10% of emulsifier.

(b) In an analogous manner a test was performed using a preparation of the following composition:

10% of 2-(O,O-diethyl - thiono - phosphoryl)-5-methyl-6-carballyloxy - pyrazolo - (1.5a) - pyrimidine (referred to as "B" in the following table)
80% of ethyl alcohol
10% of emulsifier.

(c) In an analogous manner a test was performed using a preparation of the following composition:

10% of 2 - (O,O-diethyl - thiono - phosphoryl)-5-methyl-6-carbododecyloxy - pyrazolo - (1.5a) - pyrimidine (referred to as "C" in the following table)
80% of ethyl alcohol
10% of emulsifier.

TEST RESULTS ASCERTAINED 14 DAYS AFTER INFESTATION

| Preparation | Percent of kill of mildew with concentrations of percent of active substance | | | | | |
|---|---|---|---|---|---|---|
| | 0.06 | 0.03 | 0.015 | 0.0075 | 0.00375 | 0.0019 |
| A according to invention | 100 | 99.5 | 97.3 | 93 | 82 | 71 |
| B according to invention | 100 | 99.6 | 98.9 | 95.2 | 89 | 75 |
| C according to invention | 99.9 | 99.1 | 97.8 | 84 | 77 | 69 |
| Control | 0 | 0 | 0 | 0 | 0 | 0 |
| Comparison product: | | | | | | |
| I | 97.3 | 92.7 | 88 | 82 | 69 | 58 |
| II | 66 | 50 | 40 | 40 | 30 | |
| III | 61 | 46 | 33 | 30 | 20 | |
| IV | 58 | 44 | 36 | 30 | 30 | |

The above table shown that preparations A, B and C in accordance with the invention were superior to comparison products I, II, III and IV in the control of wheat mildew, i.e. an infestation with phytopathogenous fungi.

(I)=Comparison product of Example 31 (commercial phosphine oxide preparation)
(II)=O,O-dimethyl - S - (1,2-dicarbethoxy-ethyl)-phosphorus dithioate (U.S. Pat. No. 2,578,652)
(III)=O,O-diethyl - O - (2-isopropyl-4-methyl-pyrimidyl-(6)-thionophosphate (U.S. Pat. No. 2,754,243—Diazinon)
(IV)=O,O-dimethyl - S - [2-(ethylsulfinyl)-ethyl]-phosphorus thioate (U.S. Pat. No. 2,791,599)

What is claimed is:
1. A pesticidal composition effective against insects, Acarida, phytophathogenic fungi and nematodes containing, as the active ingredient, a compound of the formula

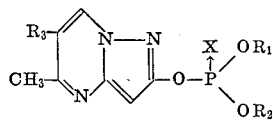

in which $R_1$ and $R_2$ are alkyl of 1 to 4 carbon atoms, $R_3$ represents a carbalkoxy of up to 13 carbon atoms or carballyloxy, and X stands for oxygen or sulfur, in admixture with a carrier selected from the group consisting of an inert solid carrier and an inert liquid carrier.

2. A pesticidal composition effective against insects, Acarida, phytopathogenic fungi and nematodes containing as the active ingredient, a compound of the formula

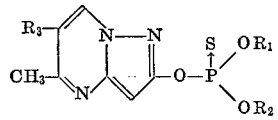

in which $R_1$ and $R_2$ are methyl or ethyl and $R_3$ is a carbalkoxy of up to 13 carbon atoms or carballyloxy, in admixture with a carrier selected from the group consisting of an inert solid carrier and an inert liquid carrier.

3. A composition as defined in claim 2 containing, as the active ingredient, 2-(O,O-diethyl-thiono-phosphoryl)-5-methyl-6-carbethoxy-pyrazolo-pyrimidine.

4. A composition as defined in claim 2 containing, as the active ingredient, 2-(O,O-dimethyl-thiono-phosphoryl)-5-methyl-6-carbethoxy-pyrazolo-pyrimidine.

5. A composition as defined in claim 2 containing, as the active ingredient, 2-(O,O-diethylthiono-phosphoryl)-5-methyl-6-carbomethoxy-pyrazolo-pyrimidine.

6. A composition as defined in claim 2 containing, as the active ingredient, 2-(O,O-diethylthiono-phosphoryl)-5-methyl-6-carbododecyloxy-pyrazolo-pyrimidine.

7. A composition as defined in claim 2 containing, as the active ingredient, 2-(O,O-diethyl-thiono-phosphoryl)-5-methyl-6-carboallyloxy-pyrazolo-pyrimidine.

8. A method of combatting pests selected from the group consisting of plant sucking insects, plant eating insects and Acarida which consists of applying to the locus infested by said pests a pesticidally effective amount of the composition of claim 1.

9. A method of combatting phytopathogenic fungi by applying to the locus infested by said fungi a fungicidally effective amount of the composition of claim 1.

10. A method of combatting nematodes which consists of applying to the locus of said nematodes a nematocidally effective amount of the composition of claim 1.

References Cited

UNITED STATES PATENTS

| | | | |
|---|---|---|---|
| 3,402,176 | 8/1968 | Schicke | 260—265.4 E |
| 3,505,327 | 4/1970 | Miller et al. | 424—200 X |

ALBERT T. MEYERS, Primary Examiner

D. R. ORE, Assistant Examiner

U.S. Cl. X.R.

424—28, 357